United States Patent
Barozzi et al.

(10) Patent No.: US 6,941,079 B1
(45) Date of Patent: Sep. 6, 2005

(54) OPTICAL DEMULTIPLEXER WITH MULTI-CHANNEL POWER CONTROL AND TILT COMPENSATION

(75) Inventors: Gianpaolo Barozzi, Milan (IT); Cinzia Ferrari, Noceto (IT); Stefano Piciaccia, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 406 days.

(21) Appl. No.: 09/865,917

(22) Filed: May 24, 2001

(51) Int. Cl.[7] ............................................. H04B 10/00
(52) U.S. Cl. .................. 398/157; 398/92; 398/94; 398/79; 398/81; 398/140; 398/141; 398/147; 398/158; 398/197; 398/202; 398/206; 398/208; 398/209; 398/214; 359/337; 359/341
(58) Field of Search ........................ 398/9, 25, 34, 398/37, 38, 43, 48, 24, 22, 79, 81, 82, 85, 398/93, 94, 135–137, 140, 147, 149, 153, 398/158, 162, 202–204, 208, 209–210, 213, 398/92, 141, 157, 197, 206, 214; 359/177, 359/160, 97, 337.1, 337.11, 337.12, 337.13, 359/341, 337

(56) References Cited

U.S. PATENT DOCUMENTS

| | | | |
|---|---|---|---|
| 5,117,196 A | 5/1992 | Epworth et al. ............ 359/333 |
| 5,245,690 A | 9/1993 | Aida et al. .................. 385/142 |
| 5,268,786 A | 12/1993 | Matsushita et al. ......... 359/341 |
| 5,311,347 A | 5/1994 | Kubo et al. ................. 359/176 |
| 5,463,487 A | 10/1995 | Epworth ..................... 359/124 |
| 5,497,264 A | 3/1996 | Bayart et al. ............... 359/337 |
| 5,506,724 A | 4/1996 | Shimizu et al. ............. 359/341 |
| 5,510,926 A | 4/1996 | Bayart et al. ............... 359/179 |
| 5,636,054 A | 6/1997 | Artigaud et al. ............ 359/341 |
| 5,644,423 A | 7/1997 | Iwano ......................... 359/337 |
| 5,675,432 A | 10/1997 | Kosaka ....................... 359/341 |
| 5,701,194 A | 12/1997 | Meli et al. .................. 359/341 |
| 5,815,299 A * | 9/1998 | Bayart et al. ................. 398/94 |
| 5,850,302 A * | 12/1998 | Strasser et al. .............. 398/93 |
| 5,852,510 A | 12/1998 | Meli et al. .................. 359/341 |
| 5,903,385 A * | 5/1999 | Sugaya et al. ........... 359/341.42 |
| 6,025,954 A | 2/2000 | Meli et al. .................. 359/341 |
| 6,049,413 A * | 4/2000 | Taylor et al. ............... 359/337 |
| 6,091,539 A * | 7/2000 | Kosaka ................... 359/341.41 |
| 6,151,157 A * | 11/2000 | Ball et al. ............... 359/337.12 |
| 6,212,001 B1 | 4/2001 | Bode ....................... 359/337.1 |
| 6,215,583 B1 * | 4/2001 | Lagerstrom et al. ..... 359/341.1 |
| 6,219,176 B1 * | 4/2001 | Terahara .................. 359/341.1 |

(Continued)

FOREIGN PATENT DOCUMENTS

EP        0 395 277 A1    10/1990

(Continued)

Primary Examiner—Hanh Phan
(74) Attorney, Agent, or Firm—Cindy Kaplan

(57) ABSTRACT

Systems and methods for controlling power of WDM channels in a WDM receiver. A preamplifier is provided prior to a demultiplexer in the WDM receiver chain. The gain of the preamplifier may be controlled based on power measurements made on individual WDM channels. A filter with controllable tilt may be employed to compensate for amplifier gain tilt and assure that all of the WDM channels remain within the dynamic range of the photodetector and receiver electronics. This provides improved bit error rate performance.

16 Claims, 4 Drawing Sheets

U.S. PATENT DOCUMENTS

| | | | |
|---|---|---|---|
| 6,233,091 B1 * | 5/2001 | Kosaka et al. | 359/341.1 |
| 6,259,542 B1 * | 7/2001 | Saunders | 398/28 |
| 6,259,555 B1 | 7/2001 | Meli et al. | 359/337 |
| 6,275,330 B1 * | 8/2001 | Izumi | 359/341.42 |
| 6,292,289 B1 | 9/2001 | Sugaya et al. | 359/337 |
| 6,323,994 B1 * | 11/2001 | Li et al. | 359/341.1 |
| 6,344,914 B1 * | 2/2002 | Shimojoh et al. | 398/17 |
| 6,347,169 B1 * | 2/2002 | Kang et al. | 385/24 |
| 6,388,801 B1 * | 5/2002 | Sugaya et al. | 359/334 |
| 6,392,769 B1 | 5/2002 | Ford et al. | 398/9 |
| 6,522,460 B2 | 2/2003 | Bonnedal et al. | 359/341.42 |
| 6,542,715 B2 | 4/2003 | Miyamoto et al. | 399/405 |
| 6,683,712 B2 | 1/2004 | Tanaka et al. | 359/341.3 |

FOREIGN PATENT DOCUMENTS

| | | |
|---|---|---|
| EP | 0 734 129 A2 | 9/1996 |
| EP | 0782289 A1 | 7/1997 |
| GB | 2294170 A | 4/1996 |

* cited by examiner

OPTICAL DEMULTIPLEXER WITH MULTI-CHANNEL POWER CONTROL AND TILT COMPENSATION

BACKGROUND OF THE INVENTION

The present invention relates to optical communication systems employing wavelength division multiplexing (WDM), and more particularly to systems and methods for conditioning optical signals at a WDM receiver.

WDM techniques are finding increasing application in optical networks. When WDM is used, multiple optical signals at different wavelengths are combined on a single fiber. This type of operation greatly increases the data carrying capacity of a single fiber. It is also then possible to add and drop individual wavelengths using optical techniques and without having to convert all the optical signals to electrical form.

In a WDM system, when it necessary to convert the multiple optical signals to electrical form, either for regeneration or for data recovery, they must be demultiplexed onto separate fibers. Once separated, the individual optical signals are converted to electrical form by photodetectors. Separating the individual signals from one another is the job of an optical component known as a demultiplexer. For optimal detection, the optical signals should have power levels within the dynamic range of the photodetectors. In some representative systems, the receiver dynamic range may be on the order of 8 dB. Since the optical signals have typically traveled a large distance without regeneration before encountering the demultiplexer and photodetectors, amplification will be necessary to achieve the necessary power levels.

The level of amplification will depend on the optical channel from the transmitter to the receiver and will vary over time. If too little amplification is used, the signals will be swamped by noise leading to bit errors in data recovery. If too much amplification is used, the detectors (or the electronic components following the detectors) will saturate, again corrupting data.

One solution to the dynamic range problem is to amplify each optical signal individually following separation by the demultiplexer. Amplifier gain is then controlled for each wavelength so as to assure that each wavelength signal is kept within the dynamic range of its photodetector. This would require that amplifier and AGC components be provided for each wavelength used. With the advent of dense WDM (DWDM) techniques where numerous closely spaced wavelengths are used, this type of solution becomes unworkable.

To optimize use of amplifier components it is preferable to place the necessary pre-amplification prior to the demultiplexer so that only one amplifier operates on all of the wavelengths. This, however, complicates gain control because amplification characteristics will not be flat over wavelength and it will be difficult to set the amplifier gain so that each WDM channel is within the dynamic range of its photodetector. One approach is to simply set gain based on a measurement of the total amplifier output power. Because the amplifier gains vary over frequency, however, this approach may cause some channels to be either above or below the receiver dynamic range. Other approaches rely on the use of filters with variable response characteristics to reduce such amplifier gain variation.

What is needed are systems and methods for controlling the power level of individual WDM channels at the receiver at low cost. The power control system should also readily adapt to large numbers of WDM channels.

SUMMARY OF THE INVENTION

Systems and methods for controlling power of WDM channels in a WDM receiver are provided by one embodiment of the present invention. A preamplifier is provided prior to a demultiplexer in the WDM receiver chain. The gain of the preamplifier may be controlled based on power measurements made on individual WDM channels. A filter with controllable tilt may be employed to compensate for amplifier gain tilt and assure that all of the WDM channels remain within the dynamic range of the photodetector and receiver electronics. This provides improved bit error rate (BER) performance.

A first aspect of the present invention provides an optical power control system configured for use with a wavelength division multiplexer. The optical power control system includes: a plurality of photodetectors connected so as to monitor output power in a plurality of outputs of the multiplexer where each of the outputs carry a different WDM channel. The optical power control system further includes a gain control system that receives power level indications from the plurality of photodetectors and controls the gain of an optical amplification system providing input to the demultiplexer. The gain control system sets a gain of the optical amplification system such that a power level indication based on the output powers monitored by the plurality of photodetectors is set within a desired range.

A second aspect of the present invention provides a WDM receiver system. The WDM receiver system includes an optical amplifier system that has variable gain and receives a WDM signal including multiple wavelengths, a demultiplexer that receives an amplified WDM signal from the optical amplifier system and separates the amplified WDM signal into a plurality of single wavelength signals each corresponding to a different WDM channel, a plurality of photodetectors monitoring power levels of the plurality of single wavelength signals, and a gain control system that receives power level indications from the plurality of photodetectors and controls a gain of the optical amplifier system such that a power level indication based on the output powers monitored by the plurality of photodetectors is set to a desired level.

Further understanding of the nature and advantages of the inventions herein may be realized by reference to the remaining portions of the specification and the attached drawings.

DESCRIPTION OF SPECIFIC EMBODIMENTS

One embodiment of the present invention is employed in the context of wavelength division multiplexing (WDM) receivers. In a WDM receiver, signals having different wavelengths that share the same fiber are isolated from one another, converted to electrical form, and demodulated to recover transmitted data. With the advent of so-called dense wave division multiplexing (DWDM) the receiver may need to handle as many as 128 or more individual optical signals at intervals of 25 GHz or less. In one typical DWDM receiver scenario, for each channel, there is a receiver unit that includes a photodetector, electronics for conditioning the photodetector signal output, and demodulator circuitry for recovering the transmitted data.

Like with any communication receiver, optimal performance is achieved only when the analog input signal power is within a desired dynamic range. In a representative WDM receiver scenario, there is an 8 dB dynamic range between 0 dBm and −8 dBm. It is necessary to keep all of the WDM channels within this range to minimize bit errors.

Figure 1:
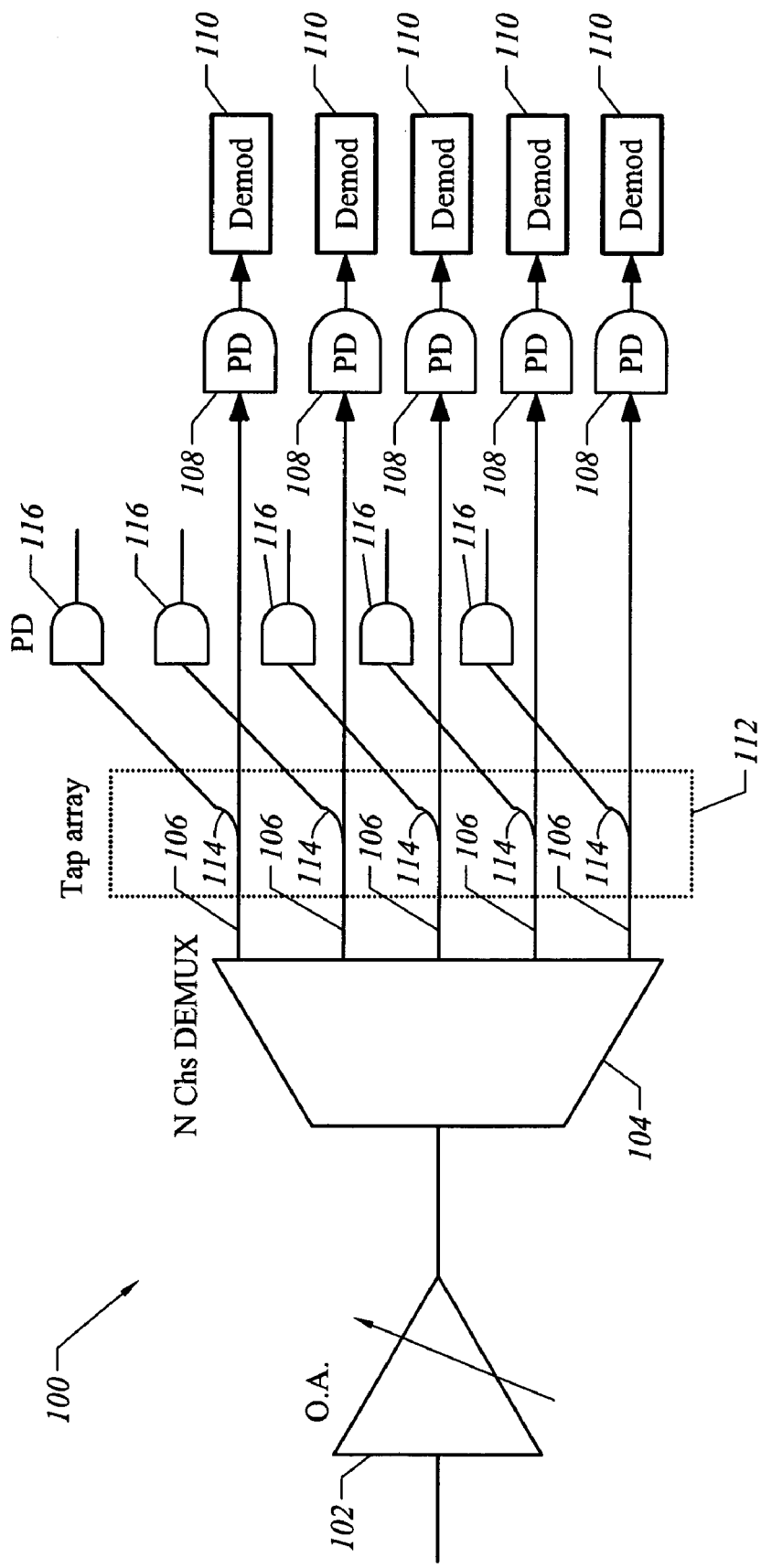
FIG. 1 depicts elements of a WDM receiver according to one embodiment of the present invention.

FIG. 1 depicts elements of a WDM receiver 100 according to one embodiment of the present invention. An optical amplifier 102 acts as a pre-amplifier for the receiver system. It will be appreciated that the optical signal incident on the input of optical amplifier 102 will typically have a relatively low signal to noise ratio having traveled a great distance without regeneration. In some scenarios, receiver system 100 will terminate a long haul (LH) or ultra-long haul (ULH) link where optical signals travel more than 500 km (LH) or more than 2000 (ULH) km without regeneration. Optical amplifier 102 may be an erbium-doped-fiber amplifier (EDFA), a Raman amplifier, or any other suitable means of controllable optical amplification. Optical amplifier 102 preferably has variable gain. The gain may be varied by varying the pump power of the laser that is used to pump the EDFA. Alternatively, a variable optical attenuator (VOA) may be placed in line at the amplifier output or within the amplifier.

The input to optical amplifier 102 is a single fiber carrying multiple signals having disparate wavelengths. There may be, e.g., 8, 16, 25, 80, 128, etc. different such signals, each occupying a different wavelength or WDM channel. It is the job of a demultiplexer 104 to separate out the individual wavelength signals so that each WDM channel is presented on its own fiber. The multiplexer 104 may be implemented using, e.g., an Arrayed Waveguide Grating (AWG), a fiber Bragg grating, cascaded Mach-Zehnder structures, interferential filters, etc. FIG. 1 depicts multiplexer 104 as having five outputs. However, it should be understood that this number of outputs was chosen merely for ease of depiction and that any number of WDM channels may be handled by demultiplexer 104.

Each WDM channel is output on its own fiber 106. In one embodiment, fibers 106 are physically coupled to one another as part of a single ribbon cable as is known in the art. Fibers 106 lead to a series of photodetectors 108. Photodetectors 108 convert the optical signals to electrical form. Data is then recovered by the operation of a series of demodulators 110. The detailed operation of photodetectors 108 and demodulators 110 will not be discussed in detail here except to note that the systems and methods of gain control provided by the present invention will operate so as to maintain the input power level to photodetectors 108 such that demodulators 110 will recover the transmitted data with a low bit error rate (BER).

The power control techniques described herein take advantage of power measurements made on the WDM channels present on the individual fibers 106. Accordingly, a tap array 112 is provided to split off a portion of the optical signal power on each of fibers 106 for power measurement. Tap array 112 includes a series of individual tap couplers 114. Each tap coupler 114 is for example a 5/95 tap coupler that taps off 5% of the power on its associated fiber 106. A series of photodetectors 116 have their inputs connected to the tap ports of tap couplers 114. Photodetectors 116 are included for the purpose of power measurement. In one embodiment, optical amplifier 102, demultiplexer 104, tap array 112 and photodetectors 116 are integrated within a single unit.

Figure 2:
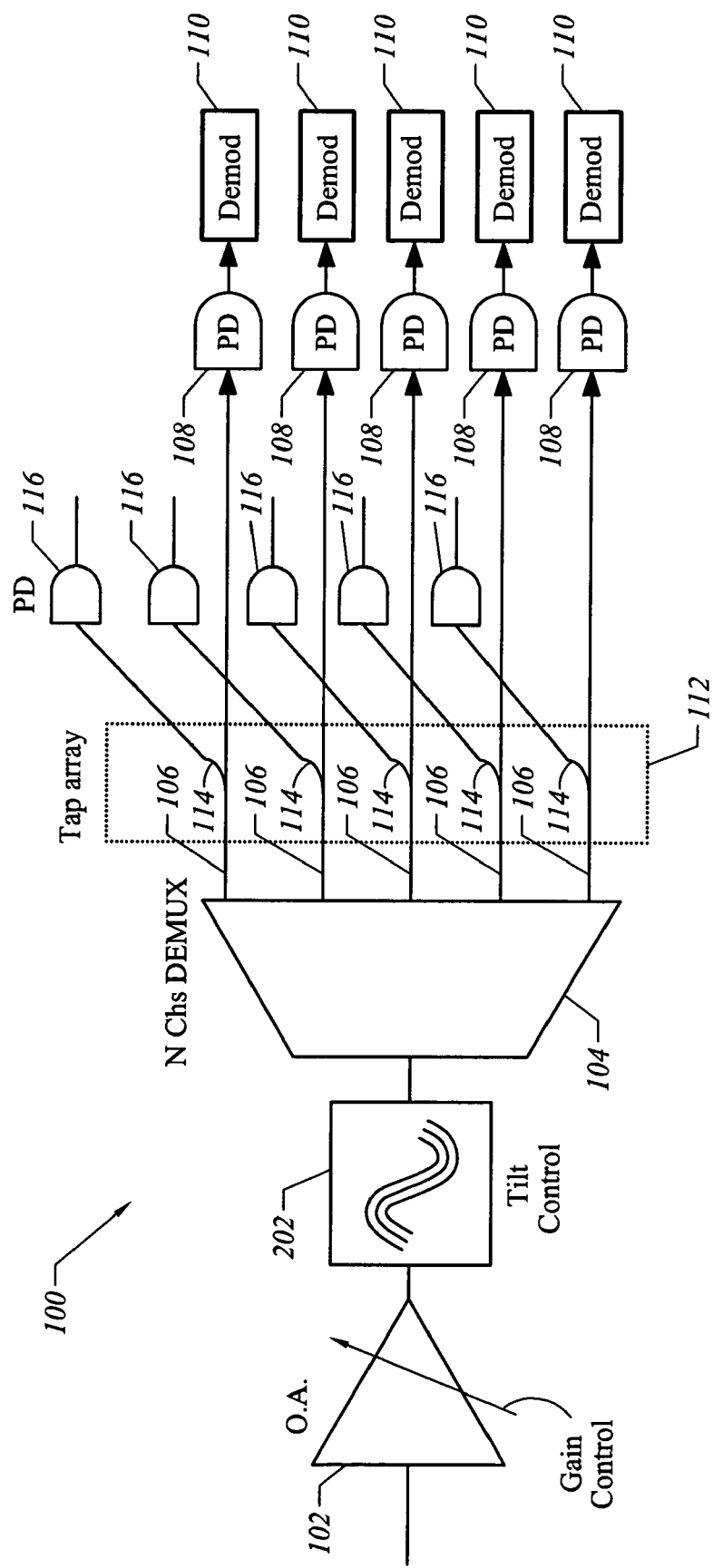
FIG. 2 depicts elements of an alternative WDM receiver according to one embodiment of the present invention.

FIG. 2 depicts an alternative WDM receiver system according to one embodiment of the present invention. The receiver system depicted in FIG. 2 is similar to that depicted in FIG. 1 except that it also includes a filter 202 with controllable tilt. The relative attenuation between the WDM channel with the highest frequency and the WDM channel with the lowest frequency may be varied over a range of e.g., 10 dB. This is used to compensate for the tilt introduced by the link and by optical amplifier 102. Such filters can compensate for simple linear tilt or flatten more complex disuniformities. Representative implementations include, for example, Mach-Zehnder interferometers, superimpositions of variable notch filters, superimpositions of optical sinusoids, etc.

The response of tilt control filter 202 has a passband that encompasses all the WDM channels. The filter response may be understood to vary linearly over frequency between the lowest frequency WDM channel and the highest frequency WDM channel. The tilt then can be understood to be the ratio of the response of the highest WDM channel over the response of the lowest WDM channel or may be understood to be the difference between these two responses The tilt may be set such that the higher WDM channels are attenuated more than the lower WDM channels, the lower WDM channels are attenuated more than the higher WDM channels, or all channels are attenuated essentially equally, etc. This is set by the tilt control signal. Filter 202 may be a "Variable Attenuation Slope Compensator" available from Sumitomo, Inc.

Figure 3:
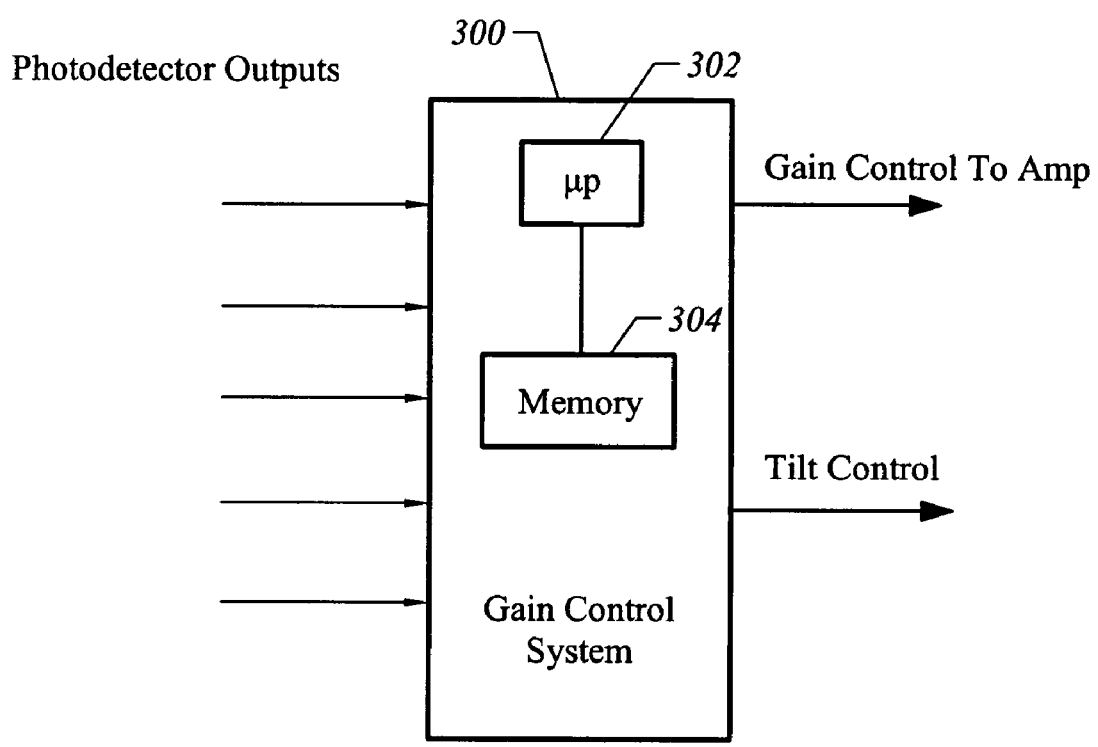
FIG. 3 shows connections to a gain control system according to one embodiment to the present invention.

FIG. 3 shows how a gain control system 300 is connected to the receiver systems depicted in FIGS. 1 and 2. The inputs to gain control system 300 are the outputs of photodetectors 116. The outputs are the gain control signal to optical amplifier 102 and the tilt control signal for tilt control filter 202. The tilt control output is only employed in conjunction with the embodiment depicted in FIG. 2. Gain control system 300 incorporates signal conditioning circuitry for analog signal processing of the photodetector outputs as known in the art. The photodetector output signals, once conditioned, are converted to digital form. Accordingly gain control system 300 incorporates a plurality of analog to digital converters (not shown) each associated with a particular one of photodetectors 116. Alternatively, a single or multiple analog to digital converters may be time-multiplexed among the photodetector outputs.

A microprocessor 302 is included to perform power and tilt control calculations according to the present invention. Instructions for operating microprocessor 302 may be stored on a computer-readable storage medium such as a memory circuit 304. The gain control and tilt control signals are then developed by analog to digital converters based on digital output provided by microprocessor 302. Microprocessor 302 may be any suitable microprocessor or microcontroller.

Other examples of computer-readable storage media include, e.g., any type of hard disk drive, optical storage medium, magnetic storage medium, magneto-optical storage medium, etc. The term "computer-readable storage medium" also generally refers to any portable storage medium used to hold instructions for execution by microprocessor 302. Examples of the portable storage media would include floppy disks, CD-ROMs, DVD-ROMs, etc. Configuring microprocessor 302 may involve transferring instructions or code from such a portable computer readable storage medium to a fixed one that is permanently connected to microprocessor 302.

Figure 4:
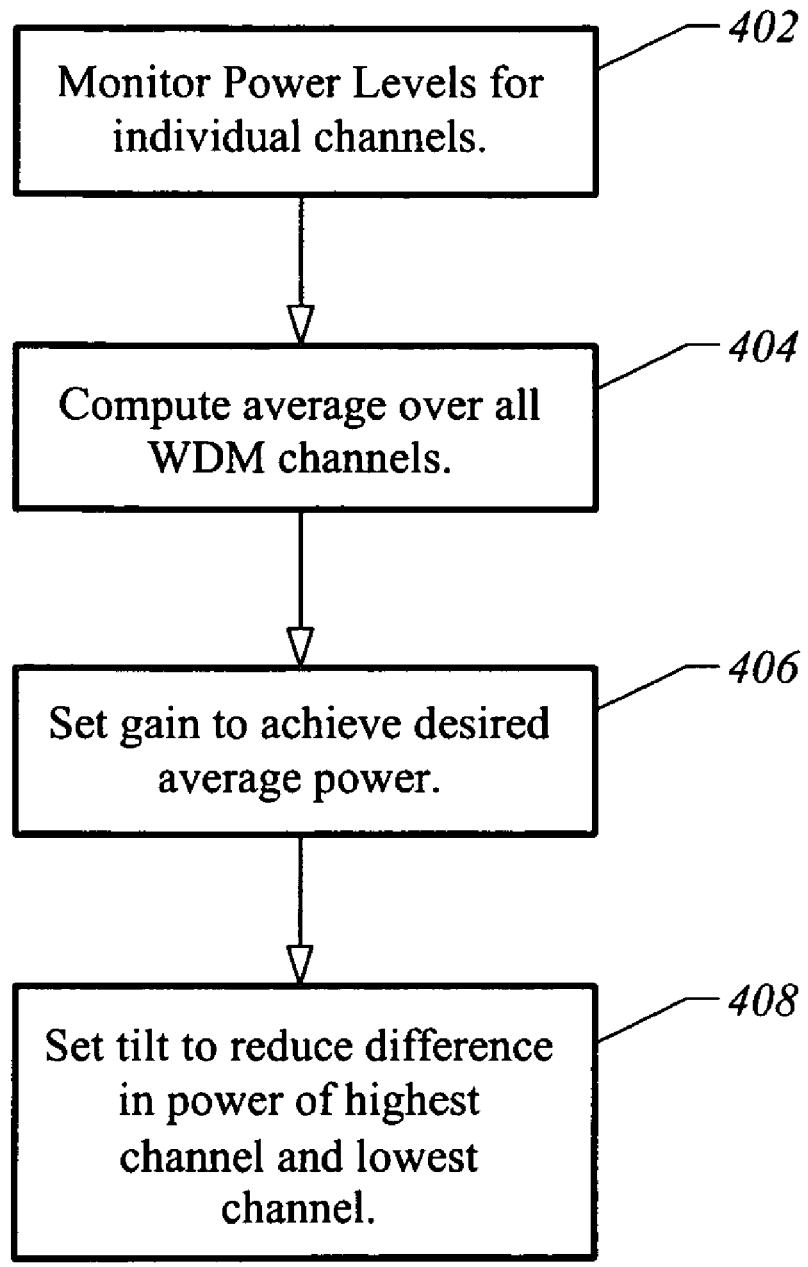
FIG. 4 is a flow chart describing steps of setting gain and gain tilt for optimal receiver operation according to one embodiment of the present invention.

FIG. 4 is a flowchart describing steps of gain and/or tilt control according to one embodiment of the present invention. At a step 402, the power levels of the individual WDM channels are monitored. At a step 404, microprocessor 302 computes an average power for all of the WDM channels. The average power is but one example of a power level indication representing all of the WDM power levels.

At a step 406, the gain of optical amplifier 102 is set to position the measured powers within the dynamic range of photodetectors 108. Various ad hoc control algorithms may be used for this purpose. For example, the gain may be coarsely adjusted to force the average measured power to the center of the dynamic range. If tilt control is not implemented, a fine adjustment may be used to try to bring all of the powers within the dynamic range. An alternative algorithm that is particularly useful when tilt control is implemented is to set the gain so that the average power is within the center of the dynamic range. If some channels remain outside the dynamic range, tilt control is invoked to pull their powers into compliance.

For the embodiment of FIG. 2, there is an additional step 408 where the tilt of tilt control filter 202 is set to reduce the difference in powers between the top and bottom WDM channels. For example, if the power level measurements show that the highest WDM channel is received at higher power than the lowest WDM channel, then the tilt control is set such that attenuation is greater at the higher frequencies and lower at the lower frequencies. This corrects the gain tilt set by the amplifier. The tilt is preferably set so that all of the WDM channels come into the dynamic range of the photodetectors.

Preferably, the gain and tilt are recomputed approximately every 100 microseconds. This allows for receiver sensitivity to be maintained even in the face of rapid changes in optical channel characteristics. Suitable control loop filtering may also be implemented.

It will be appreciated that receiver sensitivity and bit error rate are improved by the power control techniques provided by the present invention. Also, it is not necessary to control the gain of multiple amplifiers.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:

1. An optical power control system configured for use with a wavelength division demultiplexer, said optical power control system comprising:
   a plurality of photodetectors connected so as to monitor output power on a plurality of outputs of said demultiplexer, each of said outputs carrying a different WDM channel; and
   a control system that receives power level indications from said plurality of photodetectors, controls a gain of an optical amplification system providing input to an optical filter, and controls a tilt of said optical filter providing input to said demultiplexer; and
   wherein said control system sets a gain of said optical amplification system such that a power level indication based on said output powers monitored by said plurality of photodetectors is set within a desired range and sets a tilt of said optical filter such that a difference in said monitored output powers is reduced.

2. The system of claim 1 wherein said power level indication comprises an average of said output powers monitored by said plurality of photodetectors.

3. The system of claim 2 wherein said desired range corresponds to an optical receiver dynamic range.

4. The system of claim 1 wherein said control system sets a tilt of said optical filter to reduce a difference in monitored output powers for a highest WDM channel and a lowest WDM channel.

5. A WDM receiver system comprising:
   an optical amplifier system having variable gain and receiving a WDM signal comprising multiple wavelengths;
   an optical filter having dynamically controllable tilt, said optical filter receiving an amplified WDM signal input from said optical amplifier system and outputting a filtered WDM signal;
   a demultiplexer receiving said filtered WDM signal from said optical filter and separating said filtered WDM signal into a plurality of single wavelength signals each corresponding to a different WDM channel;
   a plurality of photodetectors monitoring power levels of said plurality of single wavelength signals; and
   a control system that receives power level indications from said plurality of photodetectors, controls a gain of said optical amplifier system such that a power level indication based on said output powers monitored by said plurality of photodetectors is set within a desired range, and controls a tilt of said optical filter such that a difference in said output powers monitored by said plurality of photodetectors between selected WDM channels is reduced.

6. The system of claim 5 wherein said power level indication comprises an average of said output powers monitored by said plurality of photodetectors.

7. The system of claim 6 wherein said desired range corresponds to an optical receiver dynamic range.

8. The system of claim 5 wherein said gain control system sets a tilt of said optical filter to reduce a difference in monitored output powers for a highest WDM channel and a lowest WDM channel.

9. In a WDM receiver system, a method for controlling power on multiple WDM channels, said method comprising:
   monitoring output powers on individual ones of said multiple WDM channels;
   determining a power level indication based on said monitored output powers; and
   setting amplification on a signal including said multiple WDM channels so that said power level indication falls within a desired range; and
   filtering said signal including said multiple WDM signals to adjust gain tilt among said multiple WDM channels so that a difference in said monitored output powers between selected WDM channels is reduced.

10. The method of claim 9 wherein said power level indication comprises an average of said monitored output powers.

11. The method of claim 9 further comprising:
   using a demultiplexer to separate said multiple WDM channels into individual wavelength signals.

12. The method of claim 9 wherein filtering comprises:
 filtering said signal using filter response characteristics that reduce a difference in monitored output powers for a highest WDM channel and a lowest WDM channel.

13. In a WDM receiver system, apparatus for controlling power on multiple WDM channels, said apparatus comprising:
 means for monitoring output powers on individual ones of said multiple WDM channels;
 means for determining a power level indication based on said monitored output powers;
 means for setting amplification on a signal including said multiple WDM signals so that said power level indication falls within a desired range; and
 means for filtering said signal including said multiple WDM signals to adjust gain tilt among said multiple WDM channels so that a difference in said monitored output powers between selected WDM channels is reduced.

14. The apparatus of claim 13 wherein said power level indication comprises an average of said monitored output powers.

15. The apparatus of claim 13 further comprising:

means for separating said multiple WDM channels into individual wavelength signals.

16. The apparatus of claim 13 wherein said filtering means comprises:

means for filtering said signal using filter response characteristics that reduce a difference in monitored output powers for a highest WDM channel and a lowest WDM channel.

* * * * *